(12) United States Patent
Schuell et al.

(10) Patent No.: US 12,544,276 B2
(45) Date of Patent: Feb. 10, 2026

(54) ADHESIVE EYELID CLOSURE ARTICLE

(71) Applicant: Solventum Intellectual Properties Company, Maplewood, MN (US)

(72) Inventors: Christoph Schuell, Neuss (DE); Amanda C. Engler, Woodbury, MN (US); Kiu-Yuen Tse, Woodbury, MN (US); Hironobu Ishiwatari, Düsseldorf (DE); Thomas Hannen, Krefeld (DE); Thomas Apeldorn, Mönchengladbach (DE); Uwe Grau, Hilden (DE); Donald George Peterson, Shoreview, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 442 days.

(21) Appl. No.: 18/014,796

(22) PCT Filed: Jun. 14, 2021

(86) PCT No.: PCT/IB2021/055224
§ 371 (c)(1),
(2) Date: Jan. 6, 2023

(87) PCT Pub. No.: WO2022/013643
PCT Pub. Date: Jan. 20, 2022

(65) Prior Publication Data
US 2025/0082514 A1    Mar. 13, 2025

(30) Foreign Application Priority Data

Jul. 14, 2020   (EP) .................................... 20185629

(51) Int. Cl.
*A61F 13/12*   (2006.01)
*A61F 9/04*   (2006.01)
(Continued)

(52) U.S. Cl.
CPC ........ *A61F 13/124* (2013.01); *A61F 13/0253* (2013.01); *A61F 13/0289* (2013.01)

(58) Field of Classification Search
CPC ................ A61F 13/023; A61F 13/0253; A61F 13/0289; A61F 13/124; A61F 2013/0037;
(Continued)

(56) References Cited

U.S. PATENT DOCUMENTS 4,743,249 A * 5/1988 Loveland ............... A61K 9/703
                                                    424/447
5,887,590 A    3/1999 Price
(Continued)

FOREIGN PATENT DOCUMENTS

CN         104622793 A      5/2015
CN         204766118 U     11/2015
(Continued)

OTHER PUBLICATIONS

Extended European Search Report received for EP Patent Application No. 20185629.1, mailed on Jan. 12, 2021, 2 pages.
(Continued)

*Primary Examiner* — Alireza Nia
*Assistant Examiner* — Andrew Jun-Wai Mok

(57) ABSTRACT

The disclosed adhesive eyelid closure article has a support layer and a pressure sensitive adhesive on the support layer. The support layer defines a main body and a non-adhesive tab area. The support layer has a central portion and an outer circumferential portion. The non-adhesive tab area is delimited by two recesses located in the outer circumferential portion of the support layer. The support layer has a first major surface and a second major surface opposite to the first major surface. The pressure sensitive adhesive is on at least part of the outer circumferential portion of the first
(Continued)

major surface of the support layer, forming an adhesive coated area of the support layer.

19 Claims, 6 Drawing Sheets

(51) Int. Cl.
*A61F 13/02* (2024.01)
*A61F 13/0246* (2024.01)

(58) Field of Classification Search
CPC .. A61F 2013/00497; A61F 2013/00502; A61F 2007/0004; A61F 9/00; A61F 9/007; A61F 9/00718; A61F 9/04; A61H 35/02; A61H 2205/024
See application file for complete search history.

(56) References Cited

U.S. PATENT DOCUMENTS

| | | | |
|---|---|---|---|
| 6,461,467 B2 | 10/2002 | Blatchford et al. | |
| 7,404,752 B1 * | 7/2008 | Karon | A41C 3/12 450/37 |
| 2001/0027285 A1 | 10/2001 | Heinecke et al. | |
| 2008/0051688 A1 * | 2/2008 | Lowe | A61F 13/023 602/58 |
| 2011/0212325 A1 | 9/2011 | Determan et al. | |
| 2016/0015570 A1 | 1/2016 | Heinecke et al. | |
| 2016/0289420 A1 * | 10/2016 | Van Der Waal | C08K 5/14 |
| 2017/0112676 A1 * | 4/2017 | Knepshield Williams | A61F 13/00085 |

FOREIGN PATENT DOCUMENTS

| | | | | |
|---|---|---|---|---|
| CN | 208552234 U | 3/2019 | | |
| CN | 208910210 U | 5/2019 | | |
| CN | 209347411 U | 9/2019 | | |
| DE | 2429989 A1 | 1/1976 | | |
| WO | 2000002507 A1 | 1/2000 | | |
| WO | 2010056541 A1 | 5/2010 | | |
| WO | 2010056544 A1 | 5/2010 | | |
| WO | WO-2015024076 A1 * | 2/2015 | | A61F 13/124 |
| WO | 2015130608 A1 | 9/2015 | | |
| WO | WO-2019073326 A1 * | 4/2019 | | A61B 5/6833 |
| WO | 2021090113 A1 | 5/2021 | | |

OTHER PUBLICATIONS

International Search Report for PCT Application No. PCT/IB2021/055224, mailed on Sep. 14, 2021, 4 pages.

* cited by examiner

ADHESIVE EYELID CLOSURE ARTICLE

CROSS REFERENCE TO RELATED APPLICATIONS

This application is a national stage filing under 35 U.S.C. 371 of PCT/IB2021/055224, filed Jun. 14, 2021, which claims the benefit of EP Application Serial No. 20185629.1, filed Jul. 14, 2020, the disclosure of which is incorporated by reference in its/their entirety herein.

TECHNICAL FIELD

The present disclosure relates generally to the field of medical articles, more specifically to the field of adhesive eye protection patches. The present disclosure also relates to a method of manufacturing such adhesive medical articles.

BACKGROUND

During surgery in anesthesia, sedated patient's eyes can dry out because of the suppression of the eye closing reflex and reduced eye liquid formation. In addition, during such medical procedure, the eyelids of the unconscious subject may involuntarily open, which might potentially lead to higher risks of injury or irritation of the eyes, in particular corneal abrasion.

Eyelid closure solutions known in the art for reducing eye injuries during surgery include the use of an adhesive tape which is typically applied across the upper and lower eyelids to prevent the eyes from opening during medical operations. These adhesive tapes typically suffer from excessive adhesion to the patient's shin and eyelashes, which may lead to skin damages or unwanted plucking of eyelashes and eyebrows during removal of the adhesive tape.

Based on these observations, various opaque and transparent eye patches were developed to reduce the patient's discomfort. Exemplary eye patches are disclosed e.g. in WO-A1-00/02507 (Abbasi) and WO-A1-2015/024076 (Wallis). All these known solutions suffer from various limitations or deficiencies including in particular lack of conformability to the physiological contours of a human eye, insufficient gentleness to skin, as well as suboptimal placing and removing operations.

SUMMARY

The disclosed adhesive eyelid closure article has excellent conformability to the three-dimensional physiological contours of the human eye area, and which provides excellent characteristics as to the handling, application, staying in place, and removal of the article after usage. The eyelid closure article has a support layer and a pressure sensitive adhesive on the support layer. The support layer defines a main body and a non-adhesive tab area. The support layer has a central portion and an outer circumferential portion. The non-adhesive tab area is delimited by two recesses located in the outer circumferential portion of the support layer. The support layer has a first major surface and a second major surface opposite to the first major surface. The pressure sensitive adhesive is on at least part of the outer circumferential portion of the first major surface of the support layer, forming an adhesive coated area of the support layer.

DETAILED DESCRIPTION

Figure 1:
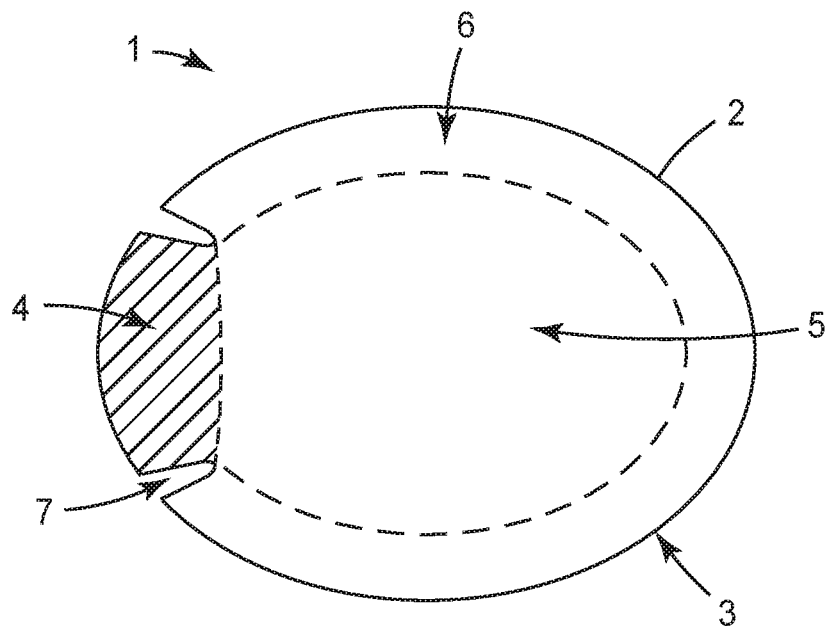
FIG. 1 illustrates a top plan view of an adhesive eyelid closure article according to one aspect of the present disclosure, wherein the adhesive coated area of the support layer is not represented.

The adhesive eyelid closure article as described above is provided with excellent conformability to the three-dimensional physiological contours of the human eye area, excellent characteristics as to the handling, application, staying in place, and removal of the article after usage, whilst providing an optimum balance of adhesive securement and gentleness to skin. The adhesive eyelid closure article as described above is further provided with excellent sealing and moisture preservation properties. Those are particularly unexpected findings as these characteristics are generally recognized as being somehow self-contradicting.

Without wishing to be bound by theory, it is believed that these excellent characteristics and performance attributes are due in particular to the presence of the non-adhesive tab area delimited by the two recesses located in the outer circumferential portion of the support layer, and to the pressure sensitive adhesive coating applied onto at least part of the outer circumferential portion of the first major surface of the support layer. The two recesses and their specific location in the outer circumferential portion of the support layer are believed to provide the excellent conformability characteristics, which translate into preventing wrinkles and stretches of the patient's skin after application of the article. As for the non-adhesive tab area delimited by the two recesses, it is believed to not only assist the excellent handling and removal of the article after usage, but also to guide the optimum positioning of the adhesive eyelid closure article over the appropriate human eye and nose area. This optimum positioning is further believed to assist a safe and comfortable removal of the article in a direction which is in accordance with the growth direction of the eyebrows. One optimum positioning typically involves the non-adhesive tab extending away from the nose in a direction substantially perpendicular to the plane formed by the human face, and the safe removal typically involves the step of pulling the non-adhesive tab in a direction substantially parallel to the plane formed by the human face.

In one aspect, the adhesive eyelid closure article of the present disclosure is provided with excellent transparency or translucency characteristics, which allows the medically treated site to remain visible not only at the time of application but also during the entire medical procedure. In another aspect, the adhesive eyelid closure article of the present disclosure is provided with excellent moisture vapor transmission characteristics.

In the context of the present disclosure, the expression "central portion of the support layer" is meant to designate the region of the backing layer which is situated between the intersection point (I) of all the axes of symmetry of the support layer and less than about two thirds of the distance between the intersection point (I) and the extremity of the support layer. The expression "outer circumferential portion of the support layer" is meant to refer to the region of the backing layer which is situated between the extremity of the support layer and about one third of the distance between the extremity of the backing layer and the intersection point (I).

The adhesive eyelid closure article of the present disclosure comprises a support layer comprising a first major surface and a second major surface opposite to the first major surface. The support layer for use herein further comprises a central portion and an outer circumferential portion. Support layers for use herein are not particularly limited. Suitable support layers for use herein, in particular their size and shape, will be easily identified by those skilled in the art in the light of the present disclosure.

In one aspect of the disclosure, the support layer for use herein comprises a material selected from the group consisting of thermoplastic polymeric films, elastomeric polymeric films, and any combinations or mixtures thereof.

In another aspect of the disclosure, the support layer for use herein comprises a material selected from the group consisting of polymeric films, in particular those derived from polyurethane, polyester, polyether block amide, polyethylene/vinyl acetate copolymer, and any combinations or mixtures thereof.

In one aspect, the support layer for use herein comprises a material selected from the group consisting of thermoplastic polyurethanes, thermoplastic (co)polyesters, and any combinations or mixtures thereof.

According to an aspect of the disclosure, the support layer for use herein has a thickness of at least 10 micrometers, at least 20 micrometers, at least 30 micrometers, at least 50 micrometers, at least 60 micrometers, at least 80 micrometers, or even at least 100 micrometers.

According to another aspect of the disclosure, the support layer for use herein has a thickness no greater than 300 micrometers, no greater than 280 micrometers, no greater than 260 micrometers, no greater than 240 micrometers, no greater than 220 micrometers, no greater than 200 micrometers, no greater than 180 micrometers, or even no greater than 150 micrometers.

According to still another aspect, the support layer for use herein has a thickness in a range from 10 to 300 micrometers, from 20 to 280 micrometers, from 30 to 260 micrometers, from 40 to 220 micrometers, from 40 to 200 micrometers, from 50 to 200 micrometers, from 50 to 180 micrometers, or even from 60 to 150 micrometers.

Suitable support layer materials for use herein are preferably chosen to have transparency or translucency characteristics, as well as high moisture vapor permeability and good conformability to anatomical surfaces.

In still another aspect, the support layer for use in the present disclosure has an overall light-transmission of at least 80%, at least 85%, at least 90%, at least 95%, or even at least 98%, relative to visible light, when measured according to ASTM D1003-13.

In yet another aspect, the support layer for use herein has a moisture vapor transmission rate (MVTR) of at least 200 $g/(m^2 \cdot 24\ h)$, at least 400 $g/(m^2 \cdot 24\ h)$, at least 600 $g/(m^2 \cdot 24\ h)$, at least 800 $g/(m^2 \cdot 24\ h)$, at least 1000 $g/(m^2 \cdot 24\ h)$, at least 1500 $g/(m^2 \cdot 24\ h)$, at least 2000 $g/(m^2 \cdot 24\ h)$, at least 2500 $g/(m^2 \cdot 24\ h)$, at least 3000 $g/(m^2 \cdot 24\ h)$, at least 3500 $g/(m^2 \cdot 24\ h)$, at least 4500 $g/(m^2 \cdot 24\ h)$, at least 5000 $g/(m^2 \cdot 24\ h)$, at least 5500 $g/(m^2 \cdot 24\ h)$, or even at least 6000 $g/(m^2 \cdot 24\ h)$, when measured according to test method DIN EN ISO 15106-1:2005.

In yet another aspect, the support layer for use herein has a moisture vapor transmission rate (MVTR) in a range from 200 to 6000 $g/(m^2 \cdot 24\ h)$, from 600 to 6000 $g/(m^2 \cdot 24\ h)$, from 1000 to 6000 $g/(m^2 \cdot 24\ h)$, from 1000 to 5000 $g/(m^2 \cdot 24\ h)$, from 1500 to 5000 $g/(m^2 \cdot 24\ h)$, from 2000 to 5000 $g/(m^2 \cdot 24\ h)$, or even from 2500 to 5000 $g/(m^2 \cdot 24\ h)$, when measured according to test method DIN EN ISO 15106-1:2005.

According to an exemplary aspect of the disclosure, the support layer (in the plane of the support layer) has an overall (outer) shape selected from the group consisting of oval, oblong, ellipse, circle, diamond, triangle, rectangle, square, and any combinations thereof.

According to a particular aspect of the disclosure, the support layer for use herein (in the plane of the support layer) has an overall elongated (outer) shape comprising curved (or rounded) angles.

In one aspect, the support layer (in the plane of the support layer) has an overall (outer) shape selected from the group consisting of oval, oblong, ellipse, and any combinations thereof.

In one aspect, the support layer has (in the plane of the support layer) an overall oval (outer) shape.

The support layer for use in the present disclosure further defines a main body and a non-adhesive tab area, wherein the non-adhesive tab area is delimited by two recesses located in the outer circumferential portion of the support layer.

Support layers for use herein are not particularly limited. Suitable recesses for use herein will be easily identified by those skilled in the art in the light of the present disclosure.

FIG. 1 illustrates a top plan view of an adhesive eyelid closure article 1 according to one aspect of the present disclosure, which comprises a support layer 2 defining a main body 3 and a non-adhesive tab area 4, wherein the support layer 2 comprises a central portion 5 and an outer circumferential portion 6, wherein the non-adhesive tab area 4 is delimited by two recesses 7 located in the outer circumferential portion 6 of the support layer 2, and wherein the adhesive coated area of the support layer is not represented.

Figure 2:
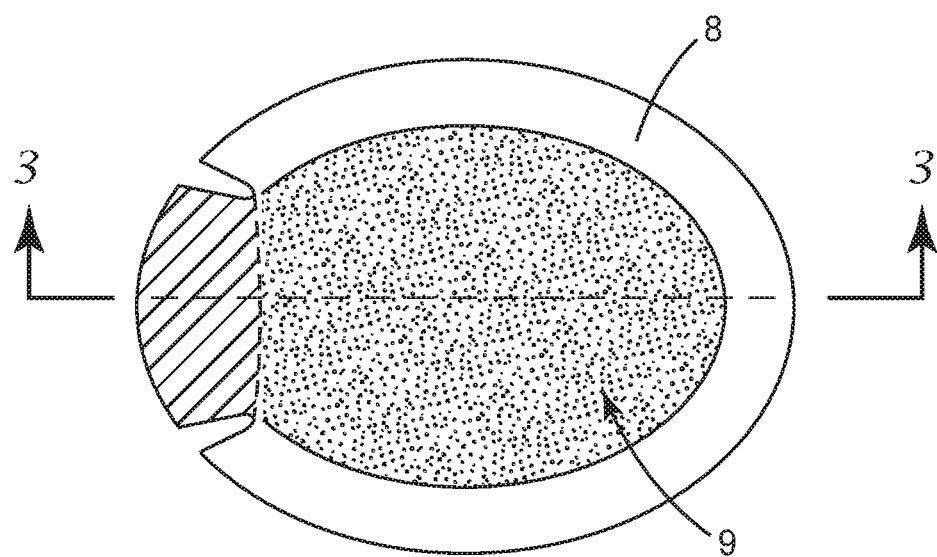
FIG. 2 illustrates a top plan view of an adhesive eyelid closure article according to another aspect of the present disclosure, wherein the adhesive coated and the adhesive uncoated area of the support layer are represented.

FIG. 2 illustrates a top plan view of an adhesive eyelid closure article 1 according to another aspect of the present disclosure, wherein the adhesive coated area 8 and the adhesive uncoated area 9 of the support layer 2 are represented.

Figure 3:
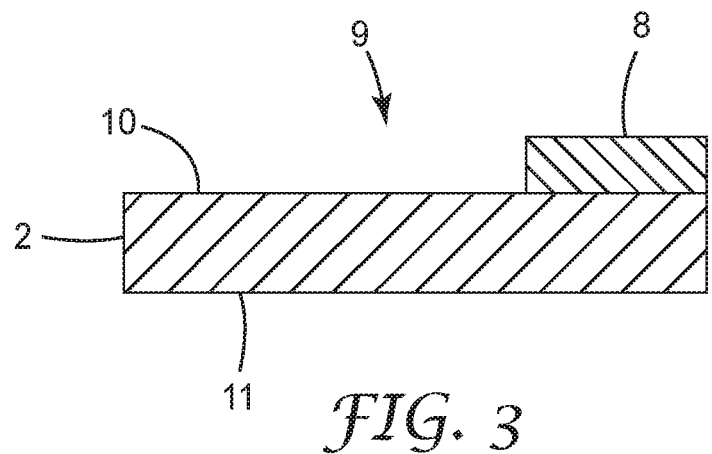
FIG. 3 is a cross-sectional view of the adhesive eyelid closure article represented in FIG. 2 taken along the lines 3-3.

FIG. 3 is a cross-sectional view of the adhesive eyelid closure article 1 represented in FIG. 2 taken along the lines 3-3, and which depicts the support layer 2 comprising a first major surface 10 and a second major surface 11, and which is provided on its first major surface 10 with an adhesive coated area 8 and an adhesive uncoated area 9 of the support layer 2.

According to typical aspect, the support layer for use herein is further provided with an outer shape defining the perimeter of the support layer.

According to one aspect, the recesses for use in the adhesive eyelid closure article of the present disclosure, and which are located in the outer circumferential portion of the support layer, extend from the perimeter of the support layer towards the central portion of the support layer.

According to another aspect, the recesses for use herein have a substantially radial configuration.

In another aspect, each recess for use herein has a width of at least 0.1 mm, at least 0.5 mm, at least 1.0 mm, or even at least 1.5 mm.

In still another aspect, each recess has a width no greater than 3 mm, no greater than 2.5 mm, or even no greater than 2 mm.

In still another aspect, each recess has a width in a range from 0.1 to 2 mm, from 0.1 to 1.5 mm, from 0.3 to 1.5 mm, from 0.5 to 1.5 mm, or even from 1.0 to 1.5 mm.

According to still another aspect, each recess has a length of at least 2 mm, at least 3 mm, at least 5 mm, at least 8 mm, or even at least 10 mm.

According to still another aspect, each recess for use herein has a length no greater than 20 mm, no greater than 18 mm, no greater than 16 mm, no greater than 15 mm, no greater than 14 mm, no greater than 12 mm, no greater than 10 mm, no greater than 9 mm, no greater than 8 mm, no greater than 7 mm, or even no greater than 5 mm.

According to still another aspect, each recess has a length in a range from 1 to 20 mm, from 1 to 18 mm, from 1 to 15 mm, from 1 to 12 mm, from 1 to 10 mm, from 1 to 9 mm, from 2 to 9 mm, from 2 to 8 mm, from 3 to 8 mm, from 3 to 7 mm, from 4 to 7 mm, or even from 5 to 6 mm.

According to still another aspect, each recess has a length-to-width ratio of at least 2, at least 3, at least 4, at least 5, at least 6, at least 7, at least 8, at least 9, or even at least 10.

According to yet another aspect, each recess has a continuous and substantially linear shape, in particular the shape of a linear strip.

According to yet another aspect, each recess has a continuous and substantially non-linear shape.

According to yet another aspect, each recess has a curved shape, in particular the shape of a curved strip.

According to a particularly aspect of the adhesive eyelid closure article of the present disclosure, each recess for use herein takes the form of a (cut-out) channel or a pathway into the support layer.

In one exemplary aspect, the average distance between the two recesses, in particular the distance between the starting points at which the two recesses extend from the perimeter of the support layer, is in a range from 10 to 50 mm, from 10 to 40 mm, from 10 to 35 mm, from 15 to 35 mm, from 15 to 30 mm, or even from 20 to 30 mm.

In a typical aspect of the disclosure, the support layer for use herein has (in the plane of the support layer) an overall (outer) shape defined by a first long edge having a first end portion and a second end portion, a second long edge opposite to the first long edge and having a first end portion and a second end portion, a first short edge connecting the first end portion of the first long edge to the first end portion of the second long edge, and a second short edge connecting the second end portion of the first long edge to the second end portion of the second long edge.

Figure 4:
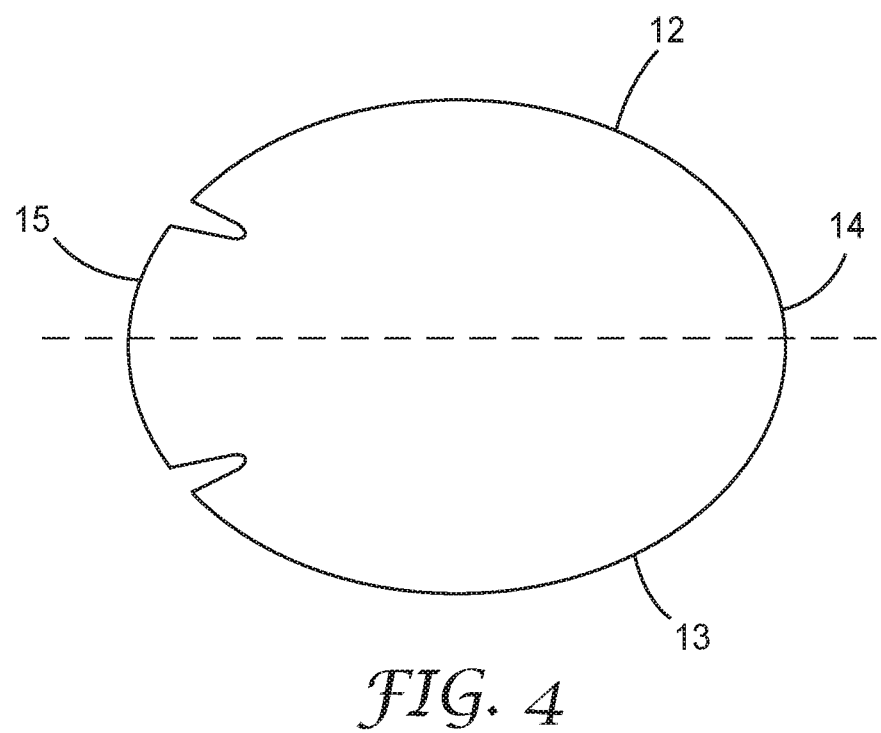
FIG. 4 illustrates a top plan view of an adhesive eyelid closure article according to another aspect of the present disclosure, wherein one particular aspect of the overall shape of the support layer is further defined. The adhesive eyelid closure article shown in FIG. 4 is represented without the non-adhesive tab area and without the adhesive coated area of the support layer.

FIG. 4 illustrates a top plan view of an adhesive eyelid closure article according to another aspect of the present disclosure, wherein one particular aspect of the overall shape of the support layer is further defined as comprising a first long edge 12 having a first end portion and a second end portion, a second long edge 13 opposite to the first long edge 12 and having a first end portion and a second end portion, a first short edge 14 connecting the first end portion of the first long edge 12 to the first end portion of the second long edge 13, and a second short edge 15 connecting the second end portion of the first long edge 12 to the second end portion of the second long edge 13. The adhesive eyelid closure article shown in FIG. 4 is represented without the non-adhesive tab area and without the adhesive coated area of the support layer.

In one particular aspect of the disclosure, the first long edge and/or the second long edge of the support layer for use herein are substantially linear. More in particular, the first long edge and the second long edge form a substantially linear section.

In another particular aspect of the disclosure, the first long edge and/or the second long edge form a substantially non-linear section. More in particular, the first long edge and/or the second long edge have a curved section, even more in particular, an arcuate section.

In one aspect, the length (perimeter section) of the second short edge is greater than the length (perimeter section) of the first short edge.

In another aspect, the two recesses for use herein, and which are located in the outer circumferential portion of the support layer, are both connected to the first short edge and/or to the second short edge.

In another aspect of the disclosure, the two recesses for use herein are both connected to either the first short edge or to the second short edge.

In a more aspect of the disclosure, the two recesses for use herein are both connected to first short edge.

According to a typical aspect of the adhesive eyelid closure article, the first recess is provided with a first end point, the second recess is provided with a second end point, and the non-adhesive tab area is further delimited by the section joining the first end point to the second end point.

According to another typical aspect of the disclosure, the section joining the first end point of the first recess to the second end point of the second recess is substantially linear.

According to a particularly aspect of the adhesive eyelid closure article of the present disclosure, the non-adhesive tab area for use herein does not (substantially) extend beyond the overall outer shape defining the perimeter of the support layer.

In one particular aspect of the disclosure, at least part of the non-adhesive tab area is further provided with an additional cover layer, which is in particular applied onto the second major surface of the support layer, although the disclosure is not that limited.

In one typical aspect, the additional cover layer for use herein (substantially fully) overlaps the non-adhesive tab area.

In one aspect of the disclosure, the additional cover layer comprises a material selected from the group consisting of woven material, nonwoven material, nonwoven fibrous webs, woven fibrous webs, knits, porous films, polymeric films, and any combinations thereof. The additional cover layer for use herein comprises a material selected from the group consisting of nonwoven material, nonwoven fibrous webs, and any combinations thereof.

Figure 5:
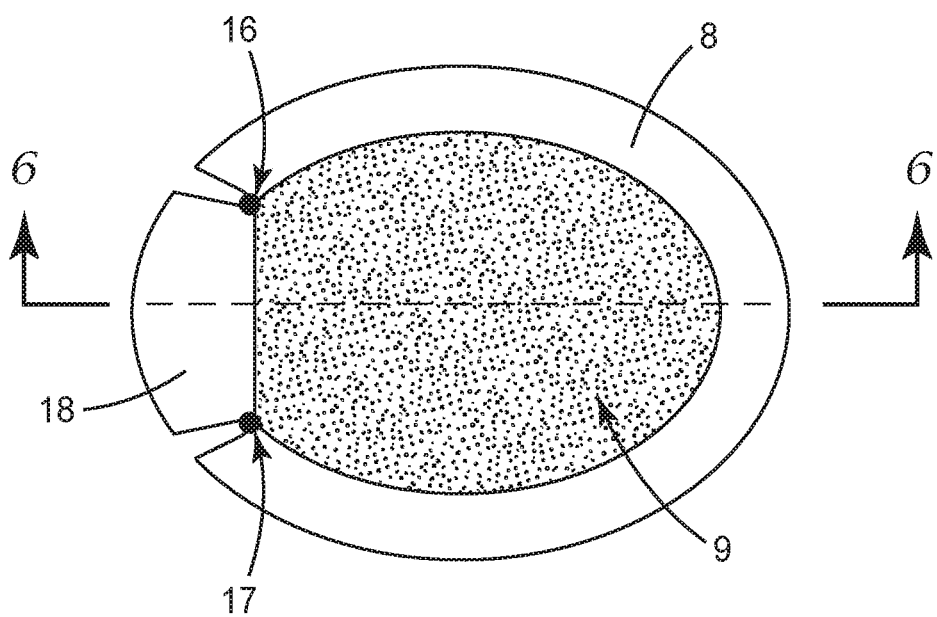
FIG. 5 illustrates a top plan view of an adhesive eyelid closure article according to another aspect of the present disclosure, wherein the article further comprises an additional cover layer fully overlapping the non-adhesive tab area.

FIG. 5 illustrates a top plan view of an adhesive eyelid closure article 1 according to another aspect of the present disclosure, wherein the article 1 comprises an additional cover layer 18 fully overlapping the non-adhesive tab area, and wherein the article 1 is further represented with the adhesive coated area 8 and an adhesive uncoated area 9 of the support layer, together with the first ending point 16 of the first recess and the second ending point 17 of the second recess.

Figure 6:
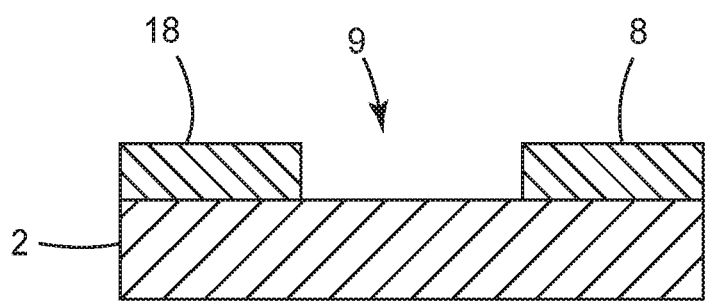
FIG. 6 is a cross-sectional view of the adhesive eyelid closure article represented in FIG. 5 taken along the lines 6-6.

FIG. 6 is a cross-sectional view of the adhesive eyelid closure article 1 represented in FIG. 5 taken along the lines 6-6, and which depicts the support layer 2 provided on its first major surface with the adhesive coated area 8, an adhesive uncoated area 9 of the support layer 2, and with an additional cover layer 18 fully overlapping the non-adhesive tab area.

The adhesive eyelid closure article of the present disclosure further comprises a pressure sensitive adhesive coating applied onto at least part of the outer circumferential portion of the first major surface of the support layer, in such a way as to form an adhesive coated area of the support layer.

Pressure sensitive adhesive coatings and application methods thereof for use herein are not particularly limited. Suitable pressure sensitive adhesive coatings and application methods thereof for use herein will be easily identified by those skilled in the art in the light of the present disclosure.

According to one aspect of the disclosure, the adhesive coated area for use herein (substantially fully) overlaps the outer circumferential portion of the first major surface of the support layer.

According to a typical aspect of the adhesive article, the adhesive coated area (substantially fully) overlaps the outer circumferential portion of the first major surface of the support layer at the exception of the non-adhesive tab area.

In one particular aspect, the adhesive coated area for use herein may at least partially overlap the central portion of the first major surface of the support layer.

In one aspect, the adhesive coated area (substantially fully) overlaps the central portion of the first major surface of the support layer.

In another aspect, the adhesive coated area for use herein at least partially overlaps the central portion of the first major surface of the support layer in such a way as to form a pressure sensitive adhesive pattern comprising a plurality of adhesive coated and adhesive uncoated portions on the central portion of the first major surface of the support layer.

In one typical aspect of the disclosure, the central portion of the first major surface of the support layer comprises a central area centered around (about) the center of symmetry of the central portion of the support layer, and the central portion of the first major surface of the support layer further comprises an annular portion (substantially) surrounding the central area.

Figure 7:
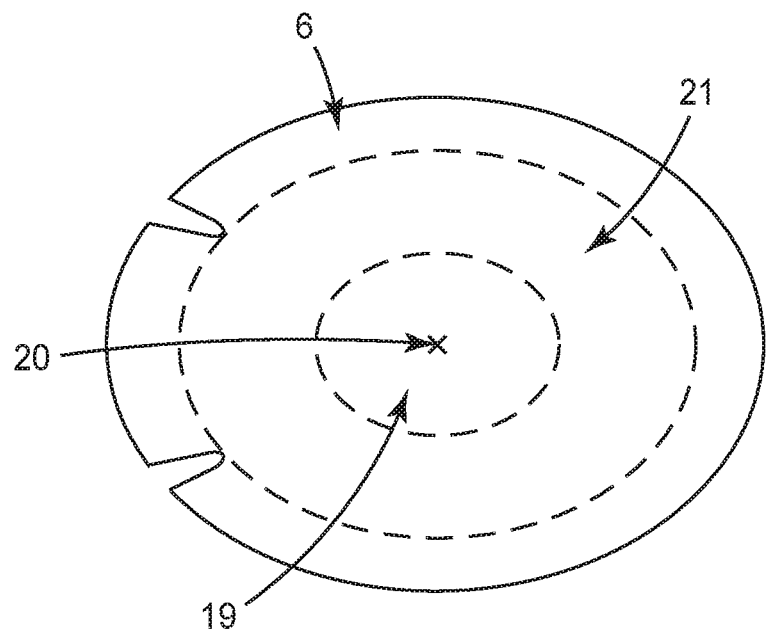
FIG. 7 illustrates a top plan view of an adhesive eyelid closure article according to another aspect of the present disclosure, wherein one particular aspect of the central portion of the support layer is further defined. The adhesive eyelid closure article shown in FIG. 7 is represented without the non-adhesive tab area and without the adhesive coated area of the support layer.

FIG. 7 illustrates a top plan view of an adhesive eyelid closure article according to such typical aspect of the present disclosure, wherein the central portion of the support layer is further defined as comprising a central area 19 centered around (about) the center of symmetry 20 of the central portion of the support layer, and the central portion of the first major surface of the support layer further comprises an annular portion 21 (substantially) surrounding the central area 19. The adhesive eyelid closure article 1 shown in FIG. 7 is represented without the non-adhesive tab area and without the adhesive coated area of the support layer.

According to one aspect of the adhesive eyelid closure article, at least one of the adhesive coated portions at least partially overlaps the central area of the central portion of the first major surface of the support layer.

According to another aspect, the plurality of the adhesive coated portions at least partially overlaps the central area of the central portion of the first major surface of the support layer.

In one particularly aspect of the adhesive article, the adhesive coated portion(s) take the form of an unconnected (island) portion(s) having in particular a shape selected from the group consisting of circle, oval, ellipse, square, rectangle, triangle, diamond, polygon, and any combinations thereof.

Figure 8:
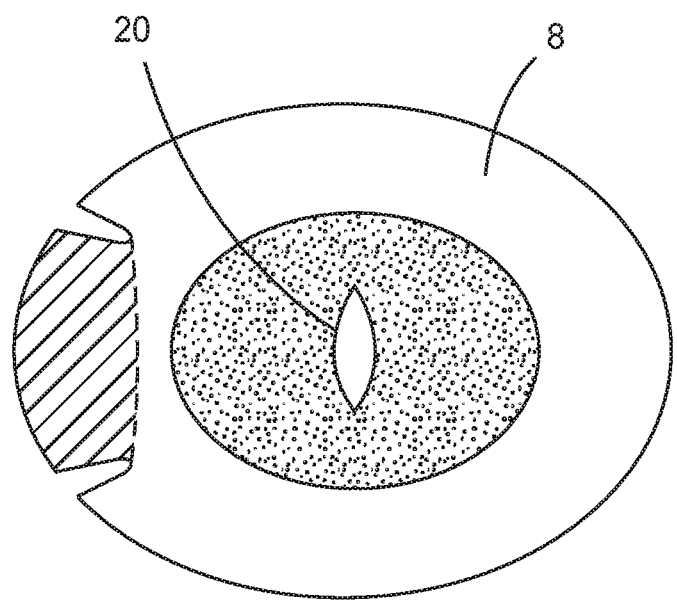
FIG. 8 illustrates a top plan view of an adhesive eyelid closure article according to another aspect of the present disclosure, wherein the central area of the central portion of the first major surface of the support layer is provided with an adhesive coated portion having the form of an unconnected island.

FIG. 8 illustrates a top plan view of an adhesive eyelid closure article according to such aspect of the present disclosure, wherein the central area of the central portion of the first major surface of the support layer is provided with an adhesive coated portion 20 having the form of an oval shaped island unconnected to the adhesive coated area 8 of the outer circumferential portion of the first major surface of the support layer. The adhesive eyelid closure article 1 shown in FIG. 8 is further represented with the non-adhesive tab area and an adhesive uncoated portion surrounding the adhesive coated portion 20.

In another particularly aspect of the adhesive article, the adhesive coated portion(s) take the form of longitudinal extension(s) (channel) connected to the adhesive coated area of the outer circumferential portion of the first major surface of the support layer.

Figure 9:
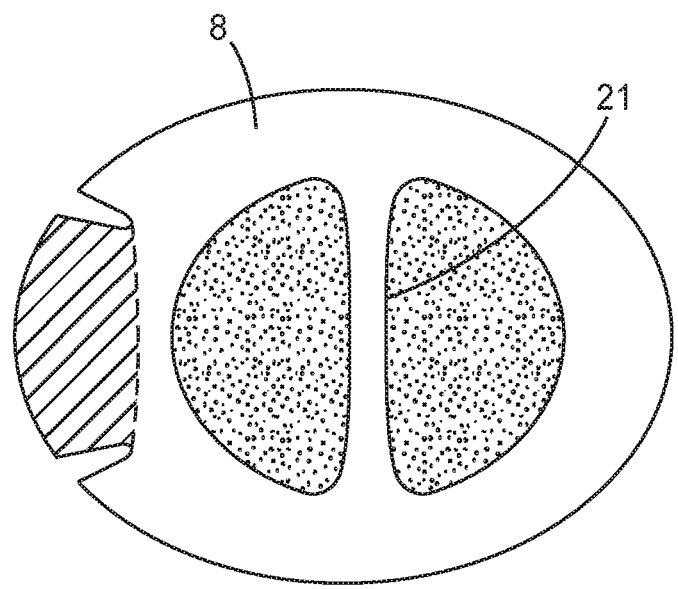
FIG. 9 illustrates a top plan view of an adhesive eyelid closure article according to another aspect of the present disclosure, wherein the central area of the central portion of the first major surface of the support layer is provided with an adhesive coated portion having the form of a longitudinal extension (channel) connected to the adhesive coated area of the outer circumferential portion of the first major surface of the support layer.

FIG. 9 illustrates a top plan view of an adhesive eyelid closure article according to such aspect of the present disclosure, wherein the central area of the central portion of the first major surface of the support layer is provided with an adhesive coated portion 21 having the form of a longitudinal extension (channel) connected to the adhesive coated area 8 of the outer circumferential portion of the first major surface of the support layer. The adhesive eyelid closure article 1 shown in FIG. 9 is further represented with the non-adhesive tab area and two adhesive uncoated portions located on two opposite sides around the adhesive coated portion 21.

According to another particular aspect of the disclosure, the adhesive coated portion(s) present on the central portion of the first major surface of the support layer take the form of a combination of unconnected (island) portion(s) and longitudinal extension(s) (channel).

According to an aspect of the disclosure, each longitudinal extension for use herein has a continuous or discontinuous substantially linear shape, in particular the shape of a linear strip.

According to another aspect of the disclosure, each longitudinal extension has a continuous or discontinuous substantially non-linear shape, in particular the shape of a curved strip.

According to one more aspect of the disclosure, each longitudinal extension takes the form of a channel or a pathway in the central portion of the first major surface of the support layer.

According to another more aspect of the disclosure, the adhesive coated portion(s) for use herein take the form of a plurality of longitudinal extensions connected to the adhesive coated area of the outer circumferential portion of the first major surface of the support layer.

According to still another more aspect of the disclosure, the adhesive coated portion(s) for use herein take the form of a plurality of longitudinal extensions radiating from the central area of the central portion towards the adhesive coated area of the outer circumferential portion of the first major surface of the support layer.

According to yet another more aspect of the disclosure, the longitudinal extensions for use herein have a substantially radial configuration.

In one aspect of the adhesive eyelid closure article, each longitudinal extension for use herein has a length-to-width ratio of at least 5, at least 10, at least 15, at least 20, at least 25, at least 30, at least 35, at least 40, at least 45, or even at least 50.

In another aspect of the disclosure, each longitudinal extension for use herein has a width of at least 0.5 mm, at least 1 mm, at least 1.5 mm, or even at least 2 mm.

In still another aspect of the disclosure, each longitudinal extension has a width no greater than 10 mm, no greater than 8 mm, no greater than 5 mm, no greater than 4 mm, no greater than 3 mm, or even no greater than 2 mm.

In yet another aspect of the disclosure, each longitudinal extension has a width in a range from 0.5 to 10 mm, from 0.5 to 8 mm, from 0.5 to 5 mm, from 0.5 to 4 mm, from 1 to 4 mm, from 1 to 4 mm, from 1.5 to 4 mm, from 1.5 to 3.5 mm, from 1.5 to 3 mm, or even from 1.5 to 2.5 mm.

In yet another aspect of the disclosure, each longitudinal extension has a length of at least 10 mm, at least 20 mm, at least 30 mm, at least 35 mm, at least 40 mm, at least 40 mm, at least 50 mm, at least 55 mm, or even at least 60 mm.

In still another aspect of the disclosure, each longitudinal extension has a length no greater than 200 mm, no greater than 180 mm, no greater than 160 mm, no greater than 150 mm, no greater than 140 mm, no greater than 120 mm, no greater than 100 mm, no greater than 90 mm, no greater than 80 mm, no greater than 70 mm, or even no greater than 65 mm.

In still another aspect of the disclosure, each longitudinal extension for use herein has a length in a range from 10 to 200 mm, from 10 to 180 mm, from 10 to 150 mm, from 10 to 120 mm, from 10 to 100 mm, from 10 to 90 mm, from 20 to 90 mm, from 20 to 80 mm, from 30 to 80 mm, from 30 to 75 mm, from 35 to 75 mm, from 35 to 70 mm, from 40 to 70 mm, from 45 to 70 mm, from 45 to 65 mm, from 50 to 65 mm, or even from 50 to 60 mm.

According to one particular aspect, the pressure sensitive adhesive pattern for use herein and comprising a plurality of adhesive coated and adhesive uncoated portions on the central portion of the first major surface of the support layer, forms a continuous pattern wherein the adhesive uncoated portions are not interconnected.

According to another particular aspect of the disclosure, the pressure sensitive adhesive pattern comprising a plurality of adhesive coated and adhesive uncoated portions on the central portion of the first major surface of the support layer, forms a discontinuous pattern wherein the adhesive uncoated portions are interconnected.

According to one aspect of the adhesive article, the plurality of adhesive uncoated portions on the central portion of the first major surface of the support layer, have a shape selected from the group consisting of circle, oval, square, triangle, diamond, polygon, linear stripes, non-linear stripes, curved stripes, in particular C-shape and S-shape stripes, and any combinations thereof.

Figure 10:
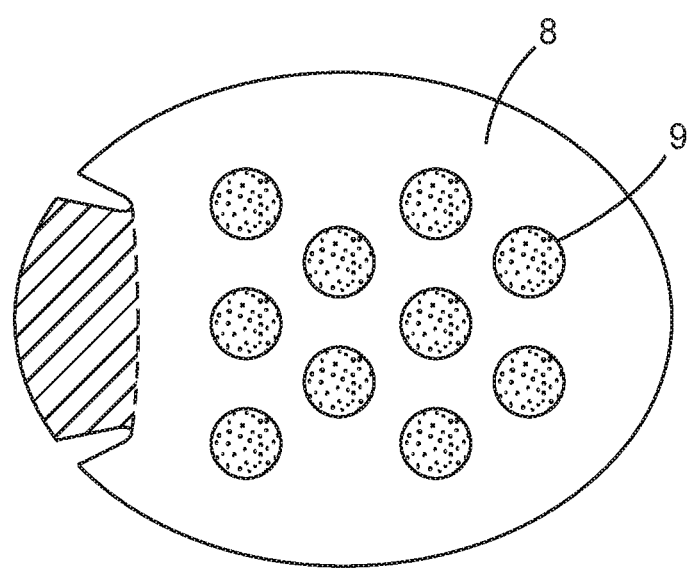
FIG. 10 illustrates a top plan view of an adhesive eyelid closure article according to another aspect of the present disclosure, wherein the central portion of the first major surface of the support layer is provided with an adhesive coated area forming a pressure sensitive adhesive pattern comprising a plurality of adhesive coated and adhesive uncoated portions on the central portion of the first major surface of the support layer, and wherein the plurality of the adhesive uncoated portions have a circle shape.

FIG. 10 illustrates a top plan view of an adhesive eyelid closure article according to such aspect of the present disclosure, wherein the central portion of the first major surface of the support layer is provided with an adhesive coated area forming a pressure sensitive adhesive pattern comprising a plurality of adhesive coated portions 8 and adhesive uncoated portions 9 on the central portion of the first major surface of the support layer, and wherein the plurality of the adhesive uncoated portions 9 have a circle shape. The adhesive eyelid closure article 1 shown in FIG. 10 is further represented with the non-adhesive tab area.

According to another aspect of the adhesive article, the plurality of adhesive coated portions on the central portion of the first major surface of the support layer, have a shape selected from the group consisting of circle, oval, square, triangle, diamond, polygon, linear stripes, non-linear stripes, curved stripes, in particular C-shape and S-shape stripes, and any combinations thereof.

According to still another aspect of the adhesive article, the adhesive coated area (substantially fully) overlaps the outer circumferential portion of the first major surface of the support layer at the exception of the non-adhesive tab area, wherein the adhesive coated area at least partially overlaps the central portion of the first major surface of the support layer in such a way as to form a pressure sensitive adhesive pattern comprising a plurality of adhesive coated and adhesive uncoated portions on the central portion of the first major surface of the support layer, and the adhesive coated portion(s) take the form of a longitudinal extension(s) connected (channel) to the adhesive coated area of the outer circumferential portion of the first major surface of the support layer.

In one exemplary aspect of the present disclosure, the average coat weight of the pressure sensitive adhesive coating applied onto at least part of the first major surface of the support layer is in a range from 10 to 1000 $g/m^2$, from 10 to 500 $g/m^2$, from 10 to 400 $g/m^2$, from 10 to 300 $g/m^2$, from 10 to 200 $g/m^2$, 20 to 160 $g/m^2$, from 20 to 150 $g/m^2$, from 30 to 150 $g/m^2$, from 30 to 140 $g/m^2$, from 30 to 130 $g/m^2$, from 40 to 130 $g/m^2$, from 40 to 120 $g/m^2$, from 40 to 110 $g/m^2$, from 45 to 110 $g/m^2$, or even from 50 to 105 $g/m^2$.

The pressure sensitive adhesive coating for use herein may be applied onto at least part of the first major surface of the support layer by any means known to those skilled in the art. Suitable means for forming the adhesive pattern coating for use herein include, but are not limited to, coating techniques, melt blowing techniques, and printing techniques.

Suitable coating techniques include, but are not limited to, roller coating, knife coating, dip-coating, and spray coating. The pressure sensitive adhesive coating for use herein may be applied from a hotmelt pressure sensitive adhesive material.

Suitable printing techniques for applying the pressure sensitive adhesive coating include gravure printing, block printing, intaglio printing, lithographic printing, rotary screen printing, flat screen printing, flexographic printing, and any combinations thereof.

According to one aspect of the disclosure, the pressure sensitive adhesive coating for use herein is applied onto at least part of the first major surface of the support layer by screen printing in particular from a hotmelt adhesive material.

Pressure sensitive adhesive material for use herein are not particularly limited. Suitable pressure sensitive adhesives for use herein will be easily identified by those skilled in the art in the light of the present disclosure.

Exemplary pressure sensitive adhesives for use herein comprise a material selected from the group consisting of silicones, rubbers, block copolymers, acrylates, urethane, hydrogels, hydrocolloids, and any combinations or mixtures thereof.

According to one aspect, the pressure sensitive adhesive for use herein is selected from the group consisting of silicone-based pressure sensitive adhesives, rubber-based pressure sensitive adhesives, acrylic-based pressure sensitive adhesives, and any combinations or mixtures thereof.

According to one aspect, the pressure sensitive adhesive for use herein is selected from the group consisting of silicone-based pressure sensitive adhesives.

According to one aspect, the pressure sensitive adhesive for use herein is selected from the group consisting of silicone-based pressure sensitive adhesives, wherein the silicone base material is selected from the group of crosslinked polysiloxanes, in particular crosslinked poly diorganosiloxanes, more in particular crosslinked poly dimethylsiloxanes (PDMS, also referred to as silicone gel). Silicone-based pressure sensitive adhesives and in particular silicone gels, typically result in less discomfort when adhered to and removed from skin. The combination of low skin trauma upon removal and low skin irritation upon wearing, makes silicone-based pressure sensitive adhesives and in particular silicone gels particularly suitable for gentle to skin adhesive applications. Moreover, they can be repositioned and are provided with various transparency characteristics. Examples of silicone-based pressure sensitive adhesives for use herein and methods of manufacturing thereof are described e.g. in WO 2010/056544 (Determan et al.).

Examples of commercially available silicone-based pressure sensitive adhesives for use herein include products marketed with the trade names: Dow Corning MG 7-9850; WACKER 2130. BLUESTAR 4317 and 4320, and NUSIL 6345 and 6350. Other silicone-based pressure sensitive adhesive compositions useful for use herein are commercially available, for example, from Dow Corning, Midland, MI, under the trade designation "7735" and from Momentive Performance Materials, Columbus, OH, under the trade designation "SILGRIP 6574". Some other silicone-based pressure sensitive adhesive useful for use herein are commercially available, for example, from Dow Corning under the trade designations "MG 7-9900" and "MG 7-1010": from Wacker Chemie AG, Munich, Germany, under the trade designation "SILPURAN 2130": from Bluestar Silicones, East Brunswick, NJ, under the trade designations "RT GEL 4317 and "SILBIONE RT GEL 4320"; and from NuSIL Silicone Technology, Carpinteria, CA, under the trade designations "MED-6345" and "MED-6350".

According to another aspect, the pressure sensitive adhesive for use in the present disclosure is selected from the group consisting of radiation-cured silicone-based pressure sensitive adhesives. Examples of radiation-cured silicone-based pressure sensitive adhesives for use herein and methods of manufacturing thereof are described e.g. in US-A1-2011/0212325 (Determan et al.). Radiation curing is typically accomplished through high energy radiation, such as electron beam or gamma ray radiation, as described in US-A1-2011/0212325 (Determan et al.).

According to another aspect of the disclosure, the pressure sensitive adhesive for use herein is selected from the group consisting of rubber-based pressure sensitive adhesives, in particular those derived from styrene-isoprene-styrene (SIS) rubber, styrene-butadiene-styrene (SBS) rubber, styrene-butadiene (SB) rubber, nitrile butyl rubber (NBR), polyisobutylene (PIB) rubber, polyisoprene rubber, polybutadiene rubber, acrylic rubber, silicone rubber, urethane rubber, butyl rubber, ethylene-propylene rubber, fluoro rubber, polychloroprene rubber, halobutyl rubber, butadiene-acrylonitrile rubber, any combinations or mixtures thereof.

According to still another aspect, the pressure sensitive adhesive for use in the present disclosure is selected from the group consisting of acrylic-based pressure sensitive adhesives, in particular those derived from acrylic copolymers, more in particular isooctyl acrylate:acrylamide copolymer, isooctyl acrylate:ethyleneoxide acrylate:acrylic acid terpolymer, and any mixtures thereof.

According to yet another aspect, the pressure sensitive adhesive for use in the adhesive article comprises a blend of silicone-based pressure sensitive adhesives and acrylic-based pressure sensitive adhesives.

In another execution, the pressure sensitive adhesive is selected from the group consisting of urethane-based pressure sensitive adhesives, in particular those derived from urethane (co) polymers. According to still another aspect, the pressure sensitive adhesive for use herein further comprises one or more silicate resin tackifiers, in particular those comprising structural units M, D, T, Q, and any combinations thereof.

Silicate resin tackifiers for use herein are not particularly limited. Suitable silicate resin tackifiers for use herein will be easily identified by those skilled in the art in the light of the present disclosure.

Suitable silicate tackifying resins include those resins composed of the following structural units M (i.e., monovalent $R'_3SiO_{1/2}$ units), D (i.e., divalent $R'_2SiO_{2/2}$ units), T (i.e., trivalent $R'SiO_{3/2}$ units), and Q (i.e., quaternary $SiO_{4/2}$ units), and combinations thereof. Typical exemplary silicate resins include MQ silicate tackifying resins, MQD silicate tackifying resins, and MQT silicate tackifying resins. These silicate tackifying resins usually have a number average molecular weight in the range of 100 to 50.000 g/mol, e.g., 500 to 15.000 g/mol and generally R' groups are methyl groups. MQ silicate tackifying resins are copolymeric resins where each M unit is bonded to a Q unit, and each Q unit is bonded to at least one other Q unit. MQD silicone tackifying resins are terpolymers having M, Q and D units. MQT silicate tackifying resins are terpolymers having M, Q and T units. Suitable silicate tackifying resins are commercially available from sources such as Dow Corning (e.g., DOWSIL 2-7066), Momentive Performance Materials (e.g., SR545 and SR1000), and Wacker Chemie AG (e.g., MQ 803 TF).

According to one aspect, the silicate resin tackifiers for use herein are selected from the group consisting of MQ silicate tackifying resins, and any mixtures thereof.

In one aspect, the adhesive article of the present disclosure may further comprise a removable (non-adhesive) protective layer covering at least part of the adhesive coated area of the support layer. Protective layer materials for use herein are not particularly limited. Suitable protective layer materials for use herein will be easily identified by those skilled in the art in the light of the present disclosure. Removable protective layers for use herein are well known and typically referred to in the art as release liners.

In one aspect, the removable protective layer (substantially fully) overlaps the adhesive coated area of the support layer.

In one aspect, the removable protective layer for use herein is further provided with at least one pull tab which is in particular located in the vicinity of the non-adhesive tab area, and wherein the at least one pull tab is configured such as to enable the removal of the non-adhesive protective layer in the direction opposite to the non-adhesive tab area.

According to another aspect of the present disclosure, the removable protective layer for use herein is divided in two distinct and abutting removable protective layer sections, wherein each removable protective layer section is provided with a pull tab, and wherein at least one pull tab is configured such as to enable the removal of the corresponding protective layer section in the direction opposite to the non-adhesive tab area.

The adhesive article according to which the removable protective layer for use herein is divided in two distinct and abutting removable protective layer sections, the pull tabs may be configured such as to enable the removal of the corresponding protective layer sections in the same direction.

Figure 11:
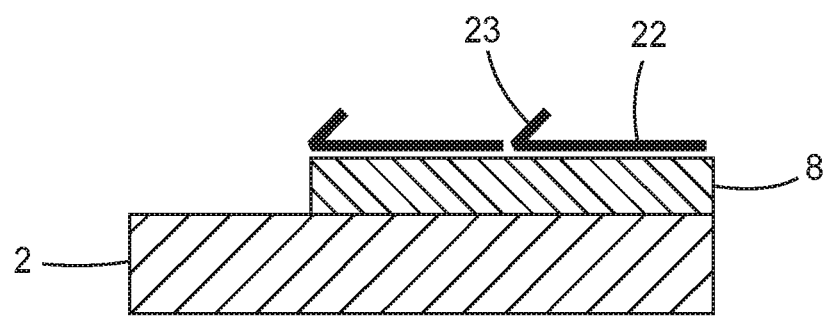
FIG. 11 is a cross-sectional view of the adhesive eyelid closure article according to another aspect of the present disclosure, and which further comprises a removable protective layer fully overlapping the adhesive coated area of the support layer.

FIG. 11 is a cross-sectional view of the adhesive eyelid closure article according to such aspect of the present disclosure, which further comprises a removable protective layer 22 fully overlapping the adhesive coated area 8 of the support layer 2 and divided in two distinct and abutting sections, wherein each removable protective layer section is provided with a pull tab 23, and wherein the pull tabs are configured such as to enable the removal of the corresponding protective layer sections in the same direction.

In another aspect of the adhesive article, the pull tabs may be configured such as to enable the removal of the corresponding protective layer sections in opposite directions.

The particular configurations of the removable protective layer as described above have been found to impact the excellent characteristics as to the handling and positioning of the adhesive eyelid closure article over the appropriate human eye and nose area.

According to one particular aspect, the adhesive article of the present disclosure may further comprise a backing layer which at least partially overlaps the second major surface of the support layer.

Backing layers for use herein are not particularly limited. Suitable backing layers for use herein will be easily identified by those skilled in the art in the light of the present disclosure.

In one exemplary aspect, the backing layer for use herein comprises a material selected from the group consisting of polymeric films, nonwoven fibrous webs, woven fibrous webs, knits, porous films, and any combinations thereof.

Suitable backing layers for use herein are preferably chosen to have rigidity, flexibility and good conformability to anatomical surfaces. Examples of backing layers for use herein are described e.g. in US-A1-2001/0027285 (Heinecke et al.).

According to a particularly aspect of the adhesive article, the backing layer for use herein (substantially fully) overlaps the second major surface of the support layer.

In one aspect, the adhesive eyelid closure article of the present disclosure is provided with excellent transparency or translucency characteristics.

According to a particularly aspect of the present disclosure, the adhesive article is transparent or at least translucent.

In the context of the present disclosure, the expression "transparent or translucent" is simply meant to designate that the adhesive article is sufficiently transparent or translucent to allow the human eyes of e.g. a medical practitioner to see the eyelids of the medically-treated patient through the adhesive article and check the open/closed status of the eye without the need to even partially remove the adhesive article.

In one aspect, the adhesive article of the present disclosure has an overall light-transmission (resulting from the light-transmission through the article) of at least 60%, at least 70%, at least 80%, at least 85%, at least 90%, or even at least 95%, relative to visible light, when measured according to ASTM D1003-13.

In another aspect, the adhesive article of the present disclosure has a haze (resulting from wide angle light scattering) no greater than 30%, no greater than 25%, no greater than 20%, no greater than 15%, no greater than 10%, or even no greater than 5%, relative to visible light, when measured according to ASTM D1003-13.

In still another aspect, the adhesive article of the present disclosure has a clarity (resulting from narrow angle light scattering) of at least 60%, at least 70%, at least 80%, at least 85%, at least 90%, or even at least 95%, relative to visible light, when measured according to ASTM D1003-13.

In another aspect, the adhesive article of the present disclosure has a moisture vapor transmission rate (MVTR) of at least 100 g/($m^2 \cdot 24$ h), at least 150 g/($m^2 \cdot 24$ h), at least 200 g/($m^2 \cdot 24$ h), at least 300 g/($m^2 \cdot 24$ h), at least 400 g/($m^2 \cdot 24$ h), at least 500 g/($m^2 \cdot 24$ h), at least 600 g/($m^2 \cdot 24$ h), at least 700 g/($m^2 \cdot 24$ h), at least 800 g/($m^2 \cdot 24$ h), at least 900 g/($m^2 \cdot 24$ h), at least 1000 g/($m^2 \cdot 24$ h), at least 1100 g/($m^2 \cdot 24$ h), or even at least 1200 g/($m^2 \cdot 24$ h), when measured according to test method DIN EN ISO 15106-1: 2005.

In still another aspect, the adhesive article of the present disclosure has a peel adhesion strength to steel of at least 0.1 N/cm, at least 0.2 N/cm, at least 0.4 N/cm, at least 0.6 N/cm, at least 0.8 N/cm, at least 1.0 N/cm, at least 1.2 N/cm), at least 1.5 N/cm, at least 1.8 N/cm, or even at least 2.0 N/cm, when measured according to test method ASTM D 330.

The adhesive articles provided with the characteristics as described above have been found to provide an excellent balance of properties including adhesive securement, gentleness to skin, sealing, moisture preservation and breathability properties.

According to another aspect, the present disclosure is directed to a method of manufacturing an adhesive eyelid closure article, comprising the steps of:
  a) providing a support layer comprising a first major surface and a second major surface opposite to the first major surface, and wherein the support layer comprises a central portion and an outer circumferential (peripheral) portion;

b) applying a pressure sensitive adhesive coating onto at least part of the outer circumferential (peripheral) portion of the first major surface of the support layer in such a way as to form an adhesive coated area of the support layer;

c) providing two recesses located in the outer circumferential (peripheral) portion of the support layer thereby defining a non-adhesive tab area; and d) applying a removable protective layer in such way as for it to least partially cover the adhesive coated area of the support layer.

In an aspect, the method as described above further comprises the steps of:

a) applying a pressure sensitive adhesive coating such as to (substantially fully) cover the outer circumferential portion of the first major surface of the support layer; and b) applying a further pressure sensitive adhesive coating onto at least part of the central portion of the first major surface of the support layer in such a way as to form a pressure sensitive adhesive pattern coating comprising a plurality of adhesive coated and adhesive uncoated portions on the central portion of the first major surface of the support layer.

According to still another aspect, the present disclosure relates to a method of applying an adhesive eyelid closure article to a human eye, comprising the steps of:

a) providing an article as described above;
b) removing the protective layer;
c) positioning the first major surface of the support layer over the eye such as to have the non-adhesive tab area positioned over the human nose; and
d) applying a surface pressure to the second major surface of the support layer such as to conform the outer circumferential (peripheral) portion of the support layer to the surface of the skin surrounding the eye.

In an aspect, the method as described above further comprises the steps of applying a surface pressure to the second major surface of the support layer is performed such that the non-adhesive tab extends from the nose in a direction substantially perpendicular to the plane formed by the human face.

According to yet another aspect, the present disclosure relates to a method of removing an adhesive eyelid closure article as described above placed on a human eye, wherein the method comprises the step of pulling the non-adhesive tab area until complete removal of the adhesive article is obtained.

All the particular and preferred aspects relating to, in particular, the support layer, the first major surface, the second major surface, the main body, the non-adhesive tab area, the recesses, the central portion, the central area, the annular portion, the outer circumferential portion, the pressure sensitive adhesive coating, the adhesive coated areas, the adhesive coated portions, the adhesive uncoated portions, which were described hereinabove in the context of the adhesive eyelid closure article, are fully applicable to the various methods as described above.

EXAMPLES

The present disclosure is further illustrated by the following examples. These examples are merely for illustrative purposes only and are not meant to be limiting on the scope of the appended claims.

Raw Materials:

In the examples, the following raw materials and products are used:

AK 1 000 000 (PDMS) is a linear, non-reactive polydimethylsiloxane (PDMS) silicone fluid with a viscosity of approx. 1000000 mm$^2$/s commercially available from Wacker Chemie AG, Germany.

MQ 803 TF is a tackifier being the co-hydrolysis product of tetraalkoxysilane (Q unit) and trimethylethoxysilane (M unit), commercially available from Wacker Chemie AG, Germany.

TPU support layer is a TPU film made out of Ellastolan 1170A (commercially available from BASF, Germany) by conventional film-coating methods, as disclosed in US-A1-2016/0015570 (Heinecke et al.) and used a support layer.

TPC support layer is a thermoplastic copolyester (TPC) film made out of Amitel VT3104 (commercially available from DSM Engineering Materials, The Netherlands) by conventional film-coating methods, as disclosed in US-A1-2016/0015570 (Heinecke et al.) and used a support layer.

EXAMPLES

General Preparation of the Exemplary Adhesive Eyelid Closure Articles:

The exemplary silicone-based pressure sensitive adhesive is prepared by adding the silicone oil and the tackifier in a laboratory jar and allowed to mix for at least 48 hours to produce a homogeneous composition using a PDMS/MQ 803 blending ratio of 80/20. The blended silicone-based pressure sensitive adhesive composition is then screen-printed onto the TPU or TPC film using a rotary screen printer (available from Stork, Charlotte, N.C.) and using the screen-printing setting and method described in U.S. Pat. No. 6,461,467 (Blatchford et al.), to obtain a uniform adhesive coating. The resulting adhesive coat weight is either 50 or 100 g/m$^2$ and the coating thickness is respectively about 50 and 100 microns. After coating, the silicone-based pressure sensitive adhesive pattern is cured by e-beam radiation using suitable conditions, as described in WO 2010/056544 (Determan et al.).

The adhesive eyelid closure articles are then die-cut using a pneumatic press such as to form an article having the overall shape as shown in FIG. 1 with a (6.0×8.0 cm) dimension.

TABLE 1

Exemplary articles and performance results.

| | Example 1 | Example 2 | Example 3 | Example 4 |
|---|---|---|---|---|
| Adhesive coating weight (g/m$^2$) | 100 | 50 | 100 | 50 |
| Support layer material | TPC | TPC | TPU | TPU |
| Support layer thickness (micrometers) | 80 | 80 | 130 | 130 |
| Adhesion to steel (N/cm)) | 2.1 | 1.5 | 1.0 | 1.2 |
| MVTR (g/(m$^2$*24 h)) | 866 | 1265 | 545 | 513 |
| Overall light transmission (%) | 89.2 | 89.3 | 93.9 | 93.8 |

As can be seen from the results shown in Table I, the adhesive eyelid closure articles according to the present disclosure provide excellent performance and characteristics as to peel adhesion, breathability and transparency properties.

The invention claimed is:

1. An adhesive eyelid closure article comprising: a) a support layer defining a main body and a non-adhesive tab area, wherein the support layer comprises a central portion and an outer circumferential portion, wherein the non-adhesive tab area is delimited by two recesses located in the outer circumferential portion of the support layer; wherein the support layer is further provided with an outer shape defining a perimeter of the support layer, and wherein the two recesses located in the outer circumferential portion of the support layer extend from the perimeter of the support layer towards the central portion of the support layer, wherein the support layer comprises a first major surface and a second major surface opposite to the first major surface; and wherein the support layer comprises a material having transparency or translucency characteristics; and b) a pressure sensitive adhesive on at least part of the outer circumferential portion of the first major surface of the support layer, forming an adhesive coated area of the support layer.

2. The adhesive eyelid closure article according to claim 1, wherein the pressure sensitive adhesive is selected from the group consisting of silicone-based pressure sensitive adhesives.

3. The adhesive eyelid closure article according to claim 2, wherein the pressure sensitive adhesive is selected from the group consisting of radiation-cured silicone-based pressure sensitive adhesives.

4. The adhesive eyelid closure article according to claim 3, wherein the pressure sensitive adhesive is selected from the group consisting of radiation-cured pressure sensitive adhesives based on poly diorganosiloxane materials.

5. The adhesive eyelid closure article according to claim 1, wherein the adhesive coated area at least partially overlaps the central portion of the first major surface of the support layer in such a way as to form a pressure sensitive adhesive pattern comprising a plurality of adhesive coated and adhesive uncoated portions on the central portion of the first major surface of the support layer.

6. The adhesive eyelid closure article according to claim 5, wherein the adhesive coated portions take the form of an unconnected portions having in particular a shape selected from the group consisting of circle, oval, ellipse, square, rectangle, triangle, diamond, polygon, and any combinations thereof.

7. The adhesive eyelid closure article according to claim 5, wherein the plurality of adhesive coated portions take the form of a longitudinal extensions connected to the adhesive coated area of the outer circumferential portion of the first major surface of the support layer.

8. The adhesive eyelid closure article according to claim 1, which further comprises a removable protective layer covering at least part of the adhesive coated area of the support layer.

9. The adhesive eyelid closure article according to claim 8, wherein the removable protective layer is further provided with at least one pull tab which is in particular located in vicinity of the non-adhesive tab area, and wherein the at least one pull tab is configured such as to enable the removal of the non-adhesive protective layer in a direction opposite to the non-adhesive tab area.

10. The adhesive eyelid closure article according to claim 1, wherein the support layer comprises a material selected from the group consisting of thermoplastic polymeric films, elastomeric polymeric films, and any combinations or mixtures thereof.

11. The adhesive eyelid closure article according to claim 1, wherein the support layer has an overall shape selected from the group consisting of oval, oblong, ellipse, circle, diamond, triangle, rectangle, square, and any combinations thereof.

12. The adhesive eyelid closure article according to claim 1, wherein the non-adhesive tab area does not extend beyond an overall outer shape defining a perimeter of the support layer.

13. The adhesive eyelid closure article according to claim 1, wherein at least part of the non-adhesive tab area is further provided with an additional cover layer, which is in particular applied onto the second major surface of the support layer.

14. The adhesive eyelid closure article according to claim 1, wherein the pressure sensitive adhesive is selected from the group consisting of silicone-based pressure sensitive adhesives, rubber-based pressure sensitive adhesives, acrylic-based pressure sensitive adhesives, and any combinations or mixtures thereof.

15. The adhesive eyelid closure article according to claim 1, which has an overall light-transmission of at least 60% relative to visible light, when measured according to ASTM D1003-13.

16. A method of manufacturing a medical adhesive article, comprising the steps of: a) providing a support layer comprising a first major surface and a second major surface opposite to the first major surface, and wherein the support layer comprises a central portion and an outer circumferential portion, wherein the support layer comprises a material having transparency or translucency characteristics; b) coating a pressure sensitive adhesive onto at least part of the outer circumferential portion of the first major surface of the support layer to form an adhesive coated area of the support layer; c) providing two recesses located in the outer circumferential portion of the support layer thereby defining a non-adhesive tab area; wherein the support layer is further provided with an outer shape defining a perimeter of the support layer, and wherein the two recesses located in the outer circumferential portion of the support layer extend from the perimeter of the support layer towards the central portion of the support layer; and d) applying a removable protective layer in such way as for it to least partially cover the adhesive coated area of the support layer.

17. The adhesive eyelid closure article according to claim 1, wherein the article is configured to provide conformability to three-dimensional physiological contours of a human eye area.

18. The adhesive eyelid closure article according to claim 1, wherein the average distance between the two recesses is in a range from 15 mm to 35 mm.

19. An adhesive eyelid closure article comprising: a) a support layer defining a main body and a non-adhesive tab area, wherein the support layer comprises a central portion and an outer circumferential portion, wherein the non-adhesive tab area is delimited by two recesses located in the outer circumferential portion of the support layer; wherein the non-adhesive tab area does not extend beyond an overall outer shape defining a perimeter of the support layer, wherein the support layer comprises a first major surface and a second major surface opposite to the first major surface; and wherein the support layer comprises a material having transparency or translucency characteristics; and b) a pressure sensitive adhesive on at least part of the outer circumferential portion of the first major surface of the support layer, forming an adhesive coated area of the support layer.

* * * * *